Aug. 24, 1937.  A. C. KRAUSE ET AL  2,090,685
FEED MIXING MILL
Filed June 13, 1936
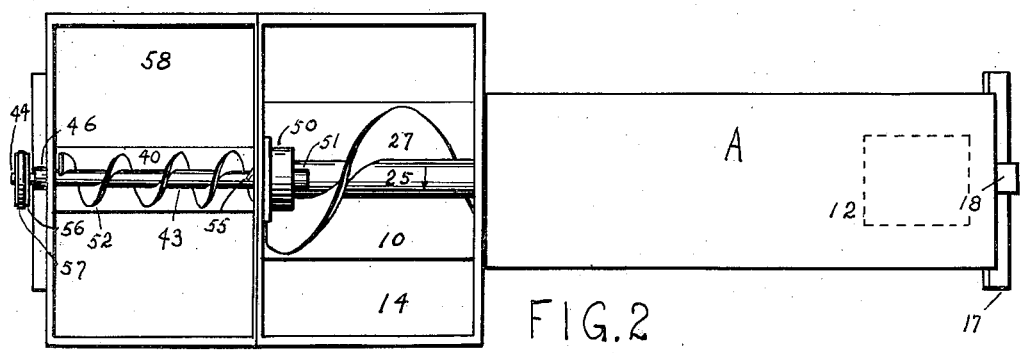
INVENTORS
Alvin C. Krause
Frank C. Krause
By A. S. Krotz
ATTORNEY Patented Aug. 24, 1937

2,090,685

UNITED STATES PATENT OFFICE 2,090,685

FEED MIXING MILL

Alvin C. Krause and Frank C. Krause, Beloit, Wis.

Application June 13, 1936, Serial No. 85,032

2 Claims. (Cl. 259—9)

Our invention refers to the type of mixers used for poultry mash and ground animal feeds, wherein a certain amount of semi-solid buttermilk or other semi-solid liquids are to be mixed therein.

Ground feeds of the class are dry and very absorbent, and semi-solid liquids, particularly buttermilk, are not easily thoroughly mixed with such feeds, partly because of the small percentage of such liquids needed, wherein if properly mixed, only a microscopic film is left on the food particles; and unless the mixing is done by applicants' device, particles or chunks of the feed will be over saturated with the liquid and other parts of the feed will have none at all; and further, the nature of the feed is such that if the buttermilk is primarily unevenly mixed with it, no amount of additional stirring will make it uniform.

Semi-solid liquids will not pour, are difficult to pump and impossible to ladle into the mixer manually in a satisfactory manner.

The applicants provide means whereby the mixing process is simplified, the semi-solid liquid easily handled and thoroughly mixed with the food particles by means of a novel tandem mixer wherein the semi-solid material is first thoroughly stirred, made soft, slightly warmed and then discharged in a small stream into the feed as it flows into the feed mixer where it is in a state of great agitation.

To these and other useful ends our invention consists of parts and combinations of parts or their equivalents, as hereinafter set forth and claimed and shown in which:

Fig. 1 is a side elevation of one form of our invention, a portion of the hoppers and feed trough being broken away to more clearly illustrate the relative position of the mixing rotors and the position of the stator.

Fig. 2 is a top view of the device as shown in Figure 1.

Fig. 3 is an end section taken on line 3—3 of Figure 1.

Fig. 4 is a horizontal section of the stator taken on line 4—4 of Figure 1, showing a fraction of the rotor.

Fig. 5 is a front view of the stator as viewed from the feed hopper, a small fraction being broken away to illustrate the inner surface thereof.

As thus illustrated, the feed mixer in its entirety, is designated by reference character A and the semi-solid liquid mixing device is designated in its entirety by reference character B. The feed mixer comprises a trough 10, the upper portion being open as at 11 and is partly covered by a lid 12 which, terminating as at 13, thereby forms an inlet for the hopper 14.

An outlet 15 is provided and the outlet end of the trough is preferably provided with a cast closure 16 having supporting feet 17 and a rotor shaft bearing 18. The inlet end of trough 10 is provided with a closure 19 having a shaft bearing 20 and supporting feet 21. We provide a tube 25, in one end of which is secured a shaft which is journaled in bearing 18 and a shaft 26 is secured to the other end of tube 25, projecting through bearing 20 as illustrated.

A spiral mixing propeller 27 of any suitable shape and design, is secured to tube 25 whereby, when the carrying tube is turned in the direction indicated by arrow in Figures 1 and 2, the feed will be agitated, mixed and delivered to outlet 15 where it may be returned by a suitable elevator, to hopper 14 for remixing and delivered to a bin or sacking machine when desired.

As illustrated in Figure 1 we show the mixer A as being positioned below the floor 28 and any suitable under support may be provided for the mixer. We provide frame angle bars 30—30 at the top of trough 10. These bars extend forwardly and terminate as at 31, having a supporting member 32. Shaft 26 is suitably journaled in member 32, the end having a V belt pulley 33 secured thereto and main driving pulleys 34 are suitably mounted on this shaft somewhere between members 19 and 32.

Our semi-solid liquid mixing and metering unit B comprises a trough 40 having end closures 41 and 42, each provided with supporting members which rest on frame bars 30 as illustrated. We provide a rotor tube 43 having shaft extensions 44 and 45. Member 41 is provided with a bearing 46 through which shaft 44 protrudes.

Our improved stator, which in its entirety is designated by reference character C, is provided with a bearing 51 into which shaft end 45 is journaled. Stator C is secured to member 42 concentric with the bottom of trough 40 and comprises a cylinder 50 having an end closure 53 to which bearing 51 is secured. We provide preferably a spiral propeller and mixer 52 which is similar to spiral 27 in member A. This spiral extends for the length of trough 40 and into stator C terminating at a point adjacent head 53. An additional spiral 54 is provided which is slightly longer than the stator whereby it extends into trough 40 a suitable distance, preferably as at 55.

We provide a V belt pulley 56 which is suitably secured to shaft 44, a belt 57 operatively embracing pulleys 56 and 33; thus the rotor in unit B will be driven by shaft 26 in the same direction as the rotor in unit A. The spiral 52 is suitably shaped to mix and stir the semi-solid buttermilk or other material which is placed in hopper 58. The action of the spiral will be to soften the material and move it into stator C where it is further churned, stirred and crowded into head 53. The inner wall of cylinder 50 is preferably provided with a number of grooves 59, to further assist the spiral to stir and move the material forward. We provide one or more nozzles 60 each having a suitable orifice and being screwthreaded into head 53 as illustrated. Stator C preferably projects into hopper 14 as illustrated.

Unit B operates as follows: The thick material will be agitated, stirred, slightly warmed, thinned and discharged into passageway 11 in one or more small streams, where it mixes with the passing ground food particles and is then thoroughly mixed by the feed mixer A. It is customary to move a batch of ground feed through the mixers two or three times; the orifice in stator C may therefore be quite small so as to extend the time of injection over two or three mixings of the feed.

Clearly spiral 27 may be mutilated or variously formed. Grooves 59 in the stator may be spiraled or the opening made larger and spiral projections formed thereon. Nozzles with variously sized orifices may be supplied and under some circumstances, we may elect to use rectangular openings in the nozzles; thus these and many detail changes may obviously be made without departing from the spirit and scope of the appended claims.

Having thus shown and described our invention, we claim:

1. A mixing device of the class described, comprising in combination, a dry feed mixer having a gravity fed inlet hopper, an opening in one side of said inlet hopper, a semi-solid liquid mixer comprising a hopper positioned adjacent said inlet hopper the bottom being formed into a circular-in-cross-section trough having an open end which registers with the opening in the side of said inlet hopper, a mixing and propelling rotor in said trough one end protruding through the opening in the side of said inlet hopper, a stator detachably secured to said trough and being adapted to inclose and rotatably support the protruding end of said rotor, a relatively small outlet in the free end of said stator, whereby the liquid ejected therefrom will contact and join the mass of dry feed as it passes through said inlet hopper.

2. A mixing device of the class described, comprising in combination, a dry feed mixer having a gravity fed inlet hopper, an opening in one side of said inlet hopper, a semi-solid liquid mixer comprising a hopper positioned adjacent said inlet hopper, the bottom being formed into a circular-in-cross-section trough having an open end which registers with the opening in the side of said inlet hopper, a mixing and propelling rotor in said trough, a stator detachably secured to said trough a portion extending into said inlet hopper opening, said stator being adapted to inclose and rotatably support the adjacent end of said rotor, a relatively small nozzle in the end of said stator the discharge end of which is positioned a distance from the wall of said inlet hopper, whereby the liquid discharged therefrom will contact and join the mass of dry feed as it falls by gravity through said inlet hopper.

ALVIN C. KRAUSE.
FRANK C. KRAUSE.